United States Patent [19]

Bates et al.

[11] Patent Number: 5,565,894
[45] Date of Patent: Oct. 15, 1996

[54] DYNAMIC TOUCHSCREEN BUTTON ADJUSTMENT MECHANISM

[75] Inventors: Cary L. Bates, Rochester; Byron T. Watts, Byron, both of Minn.

[73] Assignee: International Business Machines Corporation, Armonk, N.Y.

[21] Appl. No.: 345,266

[22] Filed: Nov. 25, 1994

Related U.S. Application Data

[63] Continuation of Ser. No. 42,048, Apr. 1, 1993, abandoned.
[51] Int. Cl.$^6$ .................................................. G09G 5/00
[52] U.S. Cl. ............................................. 345/178; 345/173
[58] Field of Search ........................... 345/173, 174–178; 178/18, 19

[56] References Cited

U.S. PATENT DOCUMENTS

| | | | |
|---|---|---|---|
| H716 | 12/1989 | McDonald et al. | 345/173 |
| 4,710,758 | 12/1987 | Mussler et al. | 345/178 |
| 4,764,885 | 8/1988 | Greanias et al. | 178/18 |
| 4,821,030 | 4/1989 | Batson et al. | |
| 4,903,012 | 2/1990 | Ohuchi | 345/178 |
| 5,003,505 | 3/1991 | McCelland | |
| 5,025,411 | 6/1991 | Tallman et al. | |
| 5,053,758 | 10/1991 | Cornett et al. | |
| 5,189,732 | 2/1993 | Kondo | 395/155 |

FOREIGN PATENT DOCUMENTS 0324306  7/1989  European Pat. Off. .

OTHER PUBLICATIONS

IBM Technical Disclosure Bulletin, "Method to Improve the Usability of Touch–Screen Panels for Computer Applications", vol. 32, No. 9B, Feb. 1990, pp. 250–253.

IBM Technical Disclosure Bulletin, "Algorithm for Decreasing the Error Rate of Data Entered on a Touch–Sensitive Terminal", vol. 33, No. 10A, Mar. 1991, pp. 223–227.

*Primary Examiner*—Curtis Kuntz
*Assistant Examiner*—Vivian Chang
*Attorney, Agent, or Firm*—Owen J. Gamon

[57]  ABSTRACT

A computer based touchscreen includes a mechanism for displaying buttons on the touchscreen indicating the location where an user has touched the touchscreen. Because different operators will view the buttons from different angles, they will touch the touchscreen in different positions. An initial button or series of buttons of the application that the user is using is configured to sense the location where the user is touching. These initial button(s) are called adjusting buttons. The button sensing regions for the remaining buttons (non-adjusting buttons) are calibrated from these initial touched locations. For example, if the user tends to press high and to the right of the adjusting button(s), the orientation of the button sensing regions for the remaining buttons is calibrated high and to the right. Any screen that displays buttons can be used to calibrate or recalibrate the button sensing region for subsequent non-adjusting buttons. This allows for greater accuracy should the users change their view or angle of the touchscreen as they use the application. Thus, the computer dynamically adjusts the orientation of a touchscreen button's sensing region based on the location that the user has pressed for previous buttons. This dynamic adjustment allows a high density of buttons to be displayed on the touchscreen.

6 Claims, 11 Drawing Sheets

Display Touchscreen

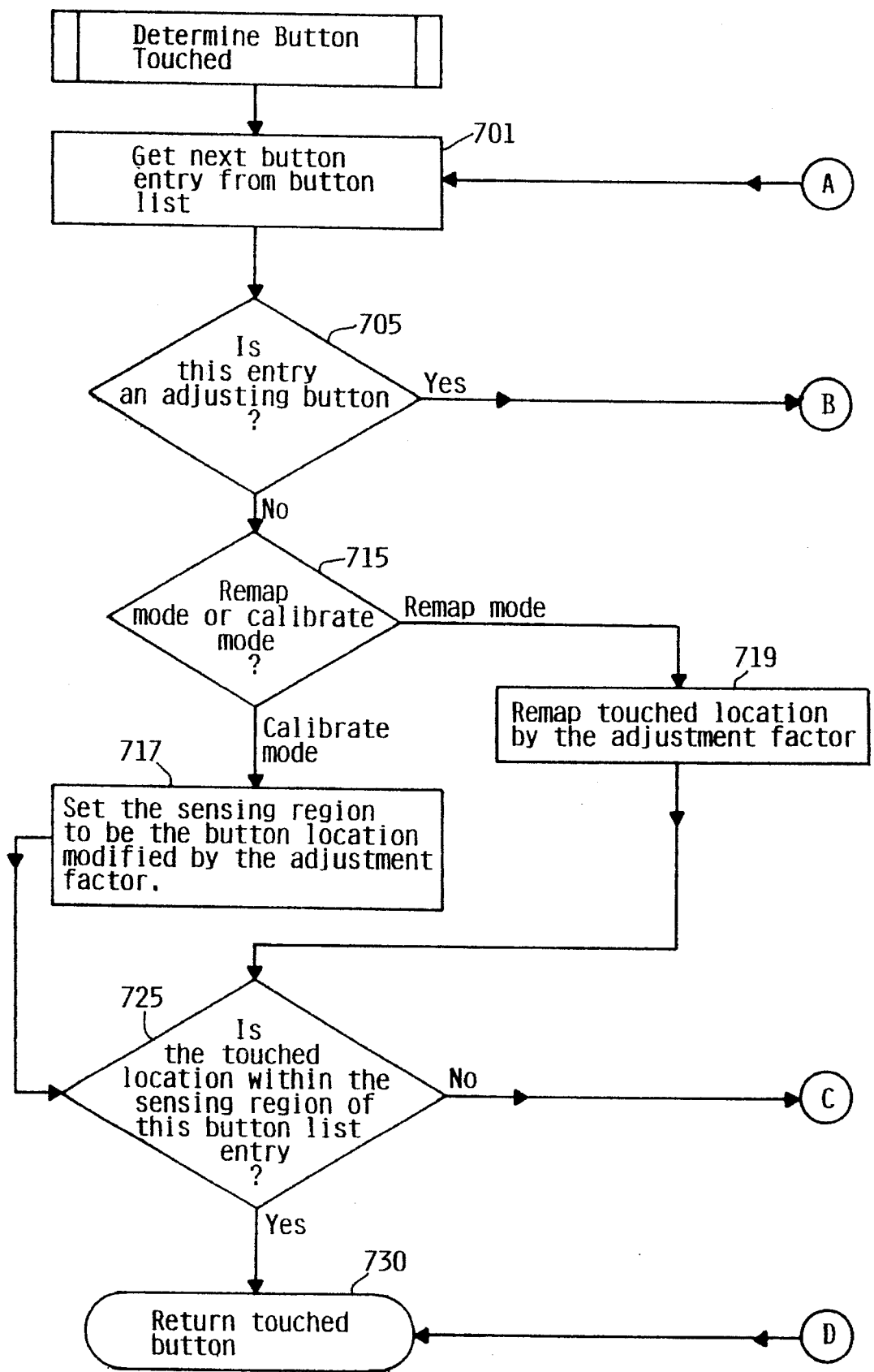
FIG. 8a  Determine Button Touched Subroutine

Determine Button
Touched Subroutine

Compute Adjustment Factor Subroutine

DYNAMIC TOUCHSCREEN BUTTON ADJUSTMENT MECHANISM

This application is a continuation of application Ser. No. 08/042,048 filed Apr. 1, 1993, now abandoned.

FIELD OF THE INVENTION

This invention relates to the data processing field. More particularly this invention relates to a touchscreen apparatus for adjusting a sensing region based on the location that the user touches on the touchscreen, which is contained in a display.

BACKGROUND

Touchscreens are well known in the art where the user communicates a desired action to a computer by touching a touchscreen in a specific location. The computer system displays graphics on the touchscreen that represent buttons. The user interfaces to the computer system by touching the touchscreen in a displayed button's sensing region, which is the area on the touchscreen that the computer system associates with the button. The computer system detects the user's touch, maps the touched location to a particular button, and performs appropriate functions based on the button that the user selected via the touch.

Touchscreens are advantageous in that they can eliminate the need for a keyboard or other input device in applications where a separate input device would be cumbersome, expensive, or susceptible to vandalism. Also, with a touchscreen the user is not forced to read instructions in one place and hunt elsewhere, such as on a keyboard, for keys to press. Instead, the instructions that the user reads and the buttons that the user touches are in the same proximity. This close proximity of instructions and buttons is more convenient and faster for the user and reduces the chance of incorrect button selection.

However, touchscreens suffer from the problem that the buttons on the touchscreen are two dimensional, and although the buttons are visually distinct from one another, they are not physically distinct from one another. Thus, while a user of a conventional keyboard can feel when a finger is straying over the edge of the intended key and onto an adjacent, unintended key, the user of a touchscreen cannot feel when a finger is straying over the edge of a button. These problems are exacerbated by the fact that the touchscreen has thickness, so while the button is projected onto the back of the touchscreen, the user touches it from the front. This screen thickness plus the parallax effect, causes different users to perceive the same button in potentially different places. For example, tall users standing to the right of the touchscreen will tend to perceive the button as being above and to the right of the actual button position, so they will tend to touch high and to the right of the button sensing region. Analogously, short users standing to the left of the touchscreen will tend to perceive the button as being below and to the left of the actual button position, so they will tend to touch low and to the left of the button sensing region.

The cumulative effect of these problems causes users to be unsure of whether or not they have touched the intended button, especially when the buttons are small and close together. In contrast, on a conventional keyboard, users can be reasonably confident that they have depressed the intended key because the key is three dimensional, moves downward when pressed, and is tactilely separate from adjacent keys.

The prior art touchscreens attempt to solve these problems by the computer system either displaying the button over a larger than desired area or utilizing a larger than desired button sensing region associated with the button. Both these solutions severely limited the density and orientation of displayed buttons on the touchscreen.

For the foregoing reasons, there is a need for a touchscreen that allows a high density of displayed buttons with accurate selection of buttons by users who are viewing the touchscreen from a variety of view angles.

SUMMARY OF THE INVENTION

It is an object of the present invention to provide an enhanced touchscreen.

It is a further object to allow a high density of displayed buttons with accurate selection of buttons to be based on a touchscreen apparatus.

It is a further object to allow accurate selection of buttons on a touchscreen apparatus by users viewing the touchscreen from all view angles.

These and other objects are achieved by the computer system dynamically adjusting the orientation of a touchscreen button's sensing region based on the location that the user has touched for a previous button or buttons.

An initial button or series of buttons of the application that the user is using is configured to sense the location where the user is touching. These initial button(s) are called adjusting buttons. The button sensing regions for the remaining buttons (non-adjusting buttons) are calibrated from these initial touched locations. For example, if the user tends to press high and to the right of the adjusting button(s), the orientation of the button sensing regions for the remaining buttons is calibrated high and to the right. If multiple adjusting buttons are used, the average of the touched positions is used to calibrate the button sensing regions of the non-adjusting buttons.

The adjusting buttons are not restricted to the beginning of the application. Any screen that displays buttons can be used to calibrate or recalibrate the button sensing region for subsequent non-adjusting buttons. This allows for greater accuracy should the users change their view or angle of the touchscreen as they use the application.

DESCRIPTION OF THE PREFERRED EMBODIMENT

Figure 1:
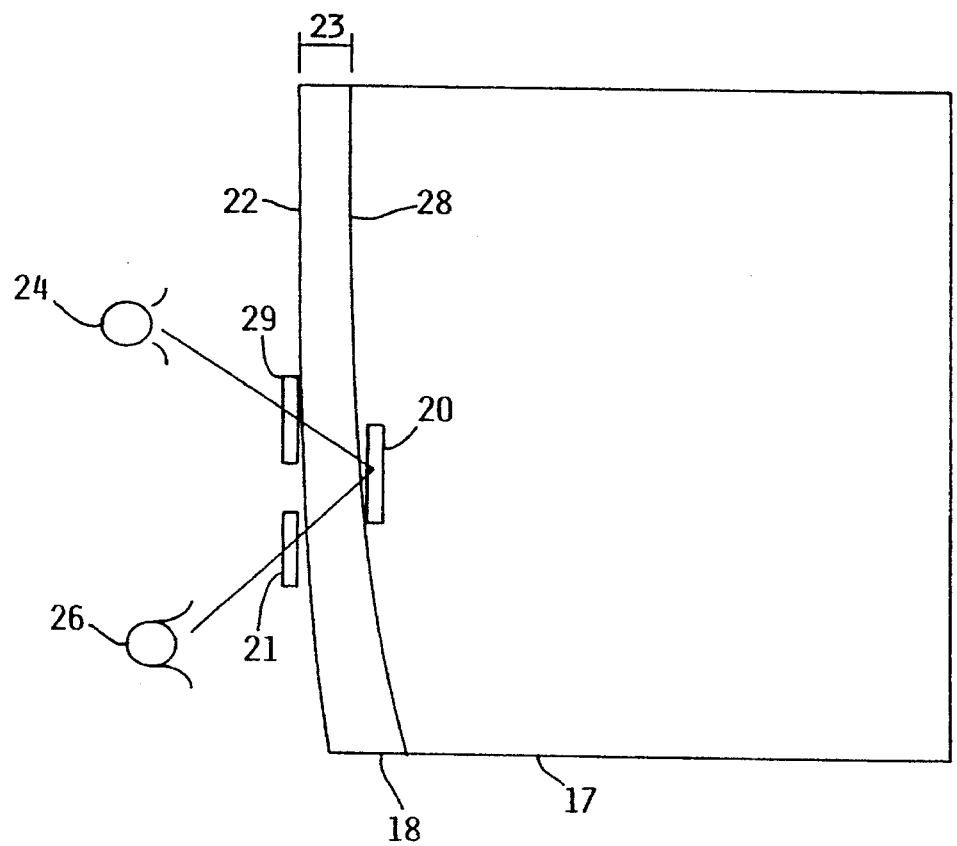
FIG. 1 shows the parallax effect, present in a touchscreen, which causes different view angles to result in different users perceiving the button at different locations.

FIG. 1 is a side view of display 17 and shows the parallax effect, which causes different user view angles to result in different users perceiving button 20 at different locations. Touchscreen 18 in display 17 has thickness 23, which is the distance between touchscreen back 28 and touchscreen front 22. Although button 20 is projected onto the touchscreen back 28, users 24 and 26 will attempt to touch it on touchscreen front 22. Screen thickness 23 plus the parallax effect, causes different operators 24 and 26 to perceive button 20 in different places. User 24 will perceive and attempt to touch button 20 at button location 29. In contrast, user 26 will perceive and attempt to touch button 20 at button location 21, which in this example is lower on touchscreen 18 than button location 29.

Figure 2:
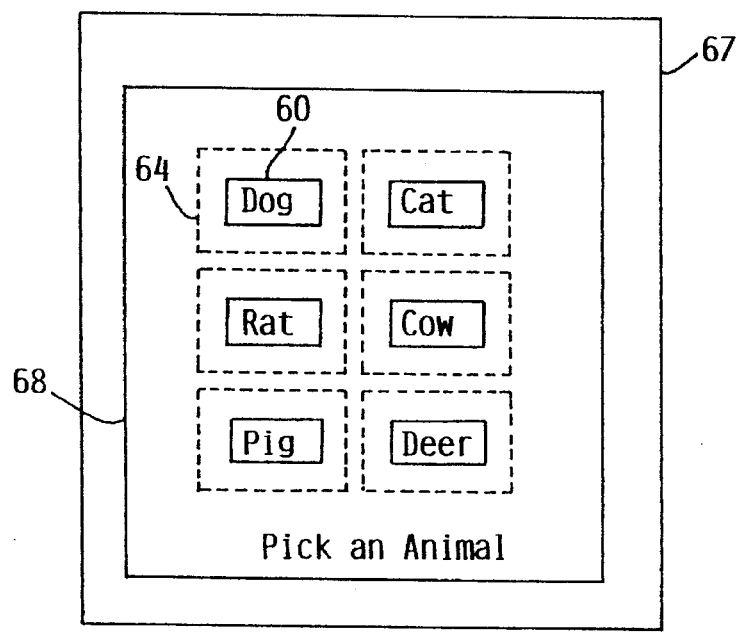
FIG. 2 shows a prior art touchscreen button and sensing region.

FIG. 2 shows prior art display 67, touchscreen 68, touchscreen button 60, and button sensing region 64. Button sensing region 64 is the area of touchscreen 68 associated with button 60 such that if the user touches within button sensing region 64, the computer system considers button 60 to have been touched. To solve the parallax problem illustrated in FIG. 1, prior art touchscreens utilized button sensing regions 64 that were larger than their corresponding buttons 60. The prior art solution illustrated by FIG. 2 is disadvantageous in that sensing regions 64 are large and thus limit the density and orientation of buttons 60 that may be concurrently displayed on touchscreen 68.

Figure 3:
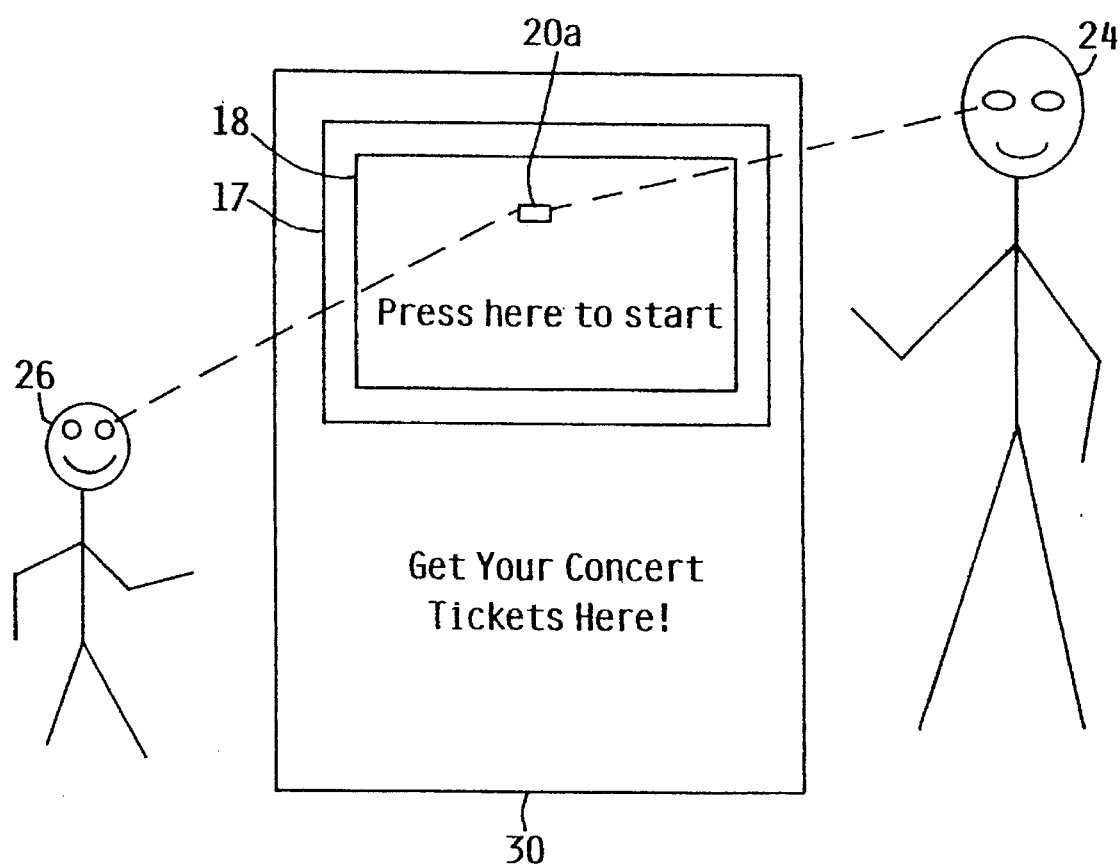
FIG. 3 shows users viewing the touchscreen of the preferred embodiment, which is shown in this example as a ticket kiosk, from different angles.

FIG. 3 shows users 24 and 26 viewing button 20 from different angles. Button 20a is displayed on touchscreen 18 in display 17. For purposes of illustration, the application in this example is ticket kiosk 30. Because of the parallax effect and screen thickness 23 described in FIG. 1., tall user 24 standing to the right of ticket kiosk 30 will tend to view and press button 20a above and to the right of its actual position. In contrast, short user 26, standing to the left of ticket kiosk 30 will tend to view and press button 20a below and to the left of its actual position. To accommodate the differences in perception of different operators, this invention dynamically adjusts the button sensing regions, as will be shown in FIGS. 4a, 4b, 6a, 6b, 6c, 6d, and 6e, and explained in more detail in the flowcharts of FIGS. 7, 8, and 9.

Figure 4A:
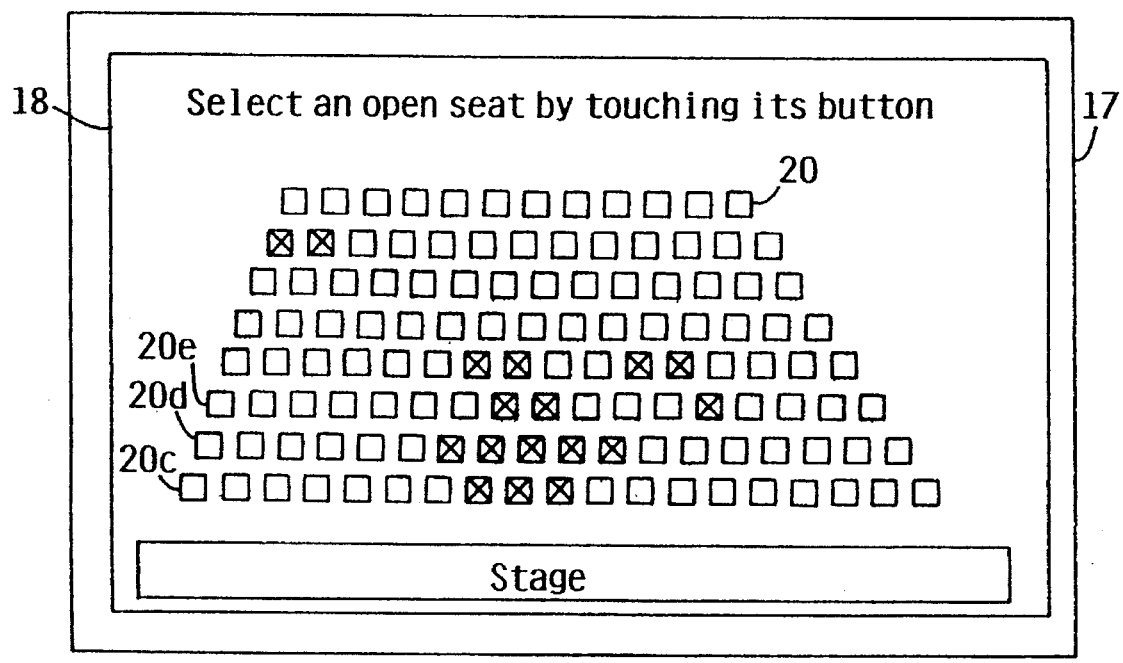
FIGS. 4a and 4b show an example of a seat selection screen of the preferred embodiment, which allows a high density of buttons on the screen.

FIG. 4a illustrates display 17 and touchscreen 18 of the preferred embodiment displaying an exemplary seat selection screen. In this example, the aggregation of all buttons 20 represents a section of seats in a stadium. Users can touch a button to select the seat for which they wish to purchase a ticket. The buttons with an X through them represent seats that have already been sold. For such a seat selection application, it is critical that the buttons be small with fine enough resolution to allow many seats to be displayed close together. This invention allows a high density of buttons with fine resolution on touchscreen 18 because the button sensing regions are dynamically adjusted to suit individual users, as will be shown in FIG. 4b.

Figure 4B:
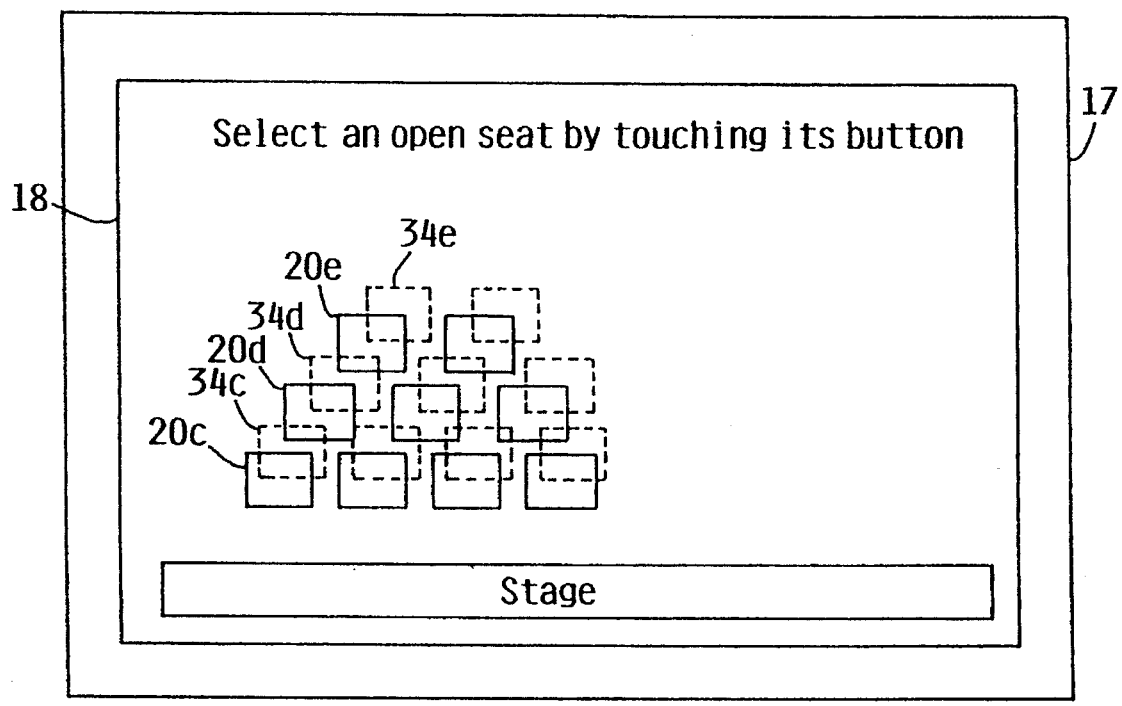

FIG. 4b is a close up view of a few of buttons 20 and their corresponding button sensing regions 34. In this example, each button sensing region 34 has been adjusted up and to the right to accommodate a user who tends to touch high and to the right of button 20. Thus, button sensing region 34c is associated with button 20c. When the user touches within button sensing region 34c, the invention associates that touch with button 20c. Likewise, when the user touches within button sensing region 34d or 34e, the invention associates that touch with buttons 20d or 20e respectively. In this way a high density of buttons 20 can be displayed and selected on touchscreen 18.

Figure 5:
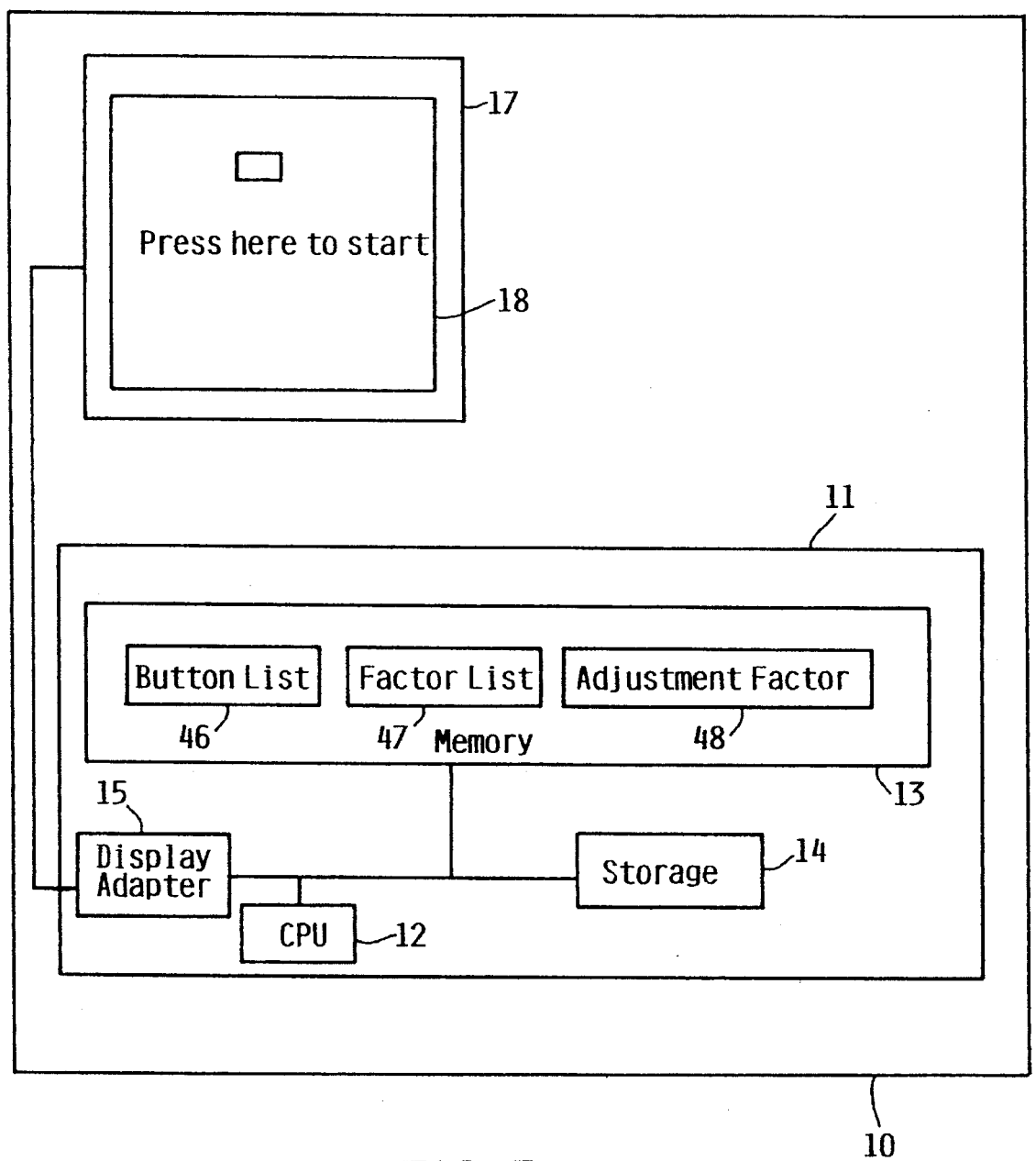
FIG. 5 shows a block diagram of the computer system of the preferred embodiment.
Figure 6A:
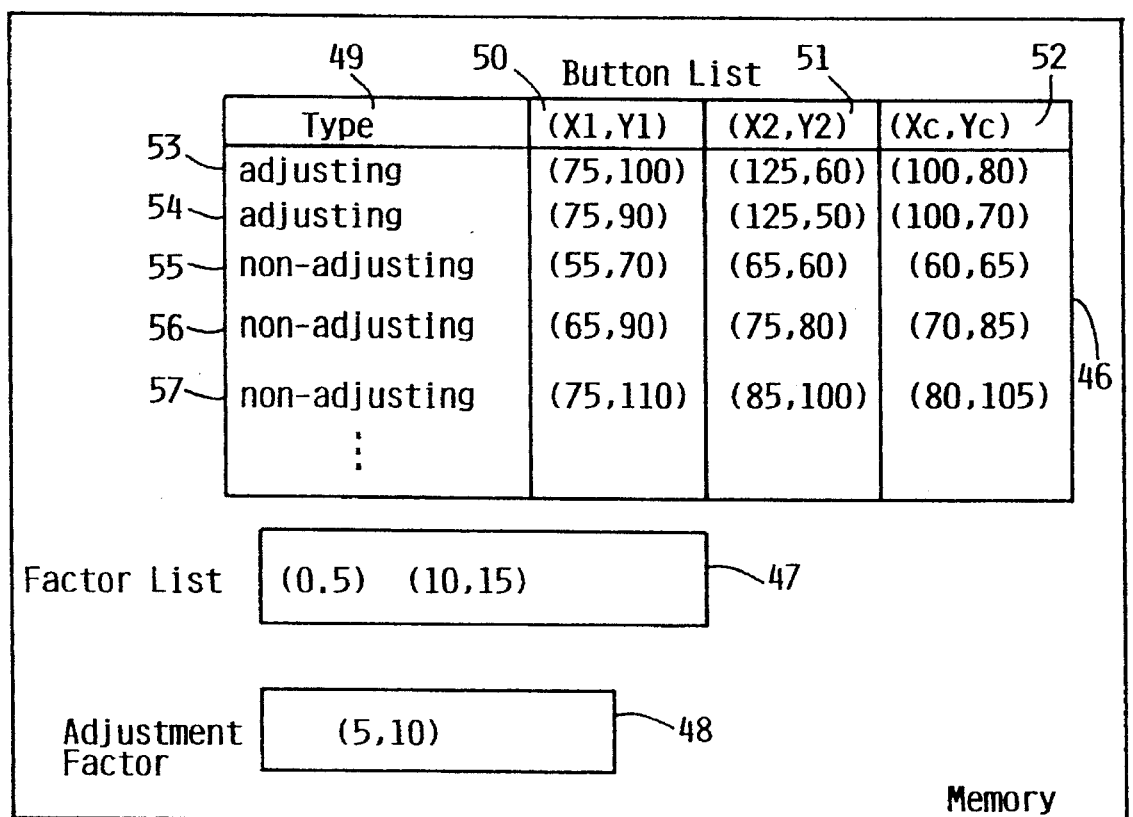
FIGS. 6a, 6b, 6c, 6d, and 6e show the button list, factor list, and adjustment factor of the preferred embodiment and their relationships to the button sensing region.
Figure 6B:
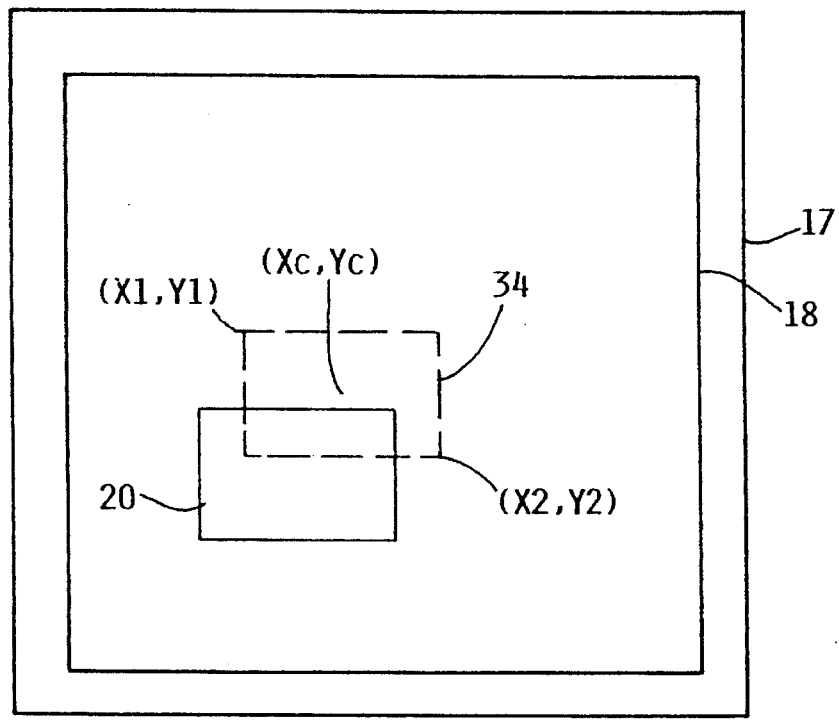
Figure 6C:
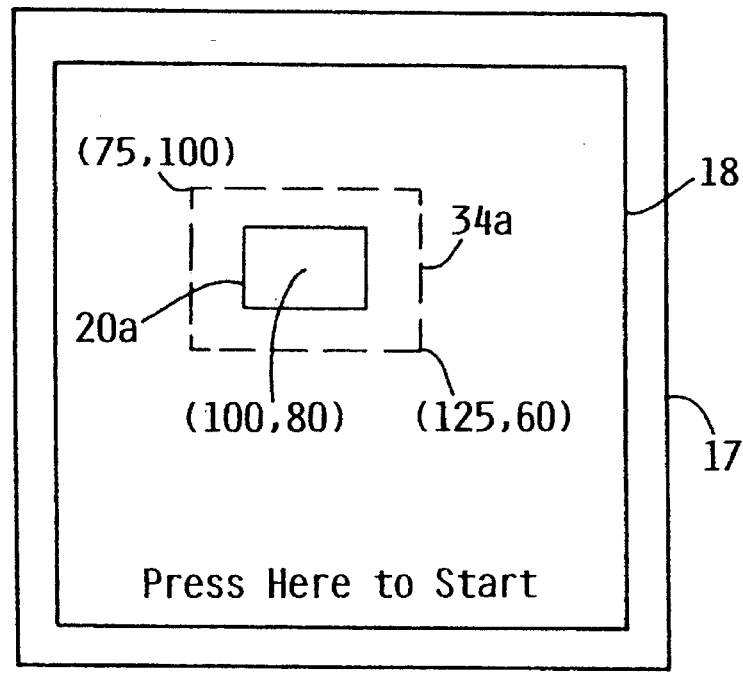
Figure 6D:
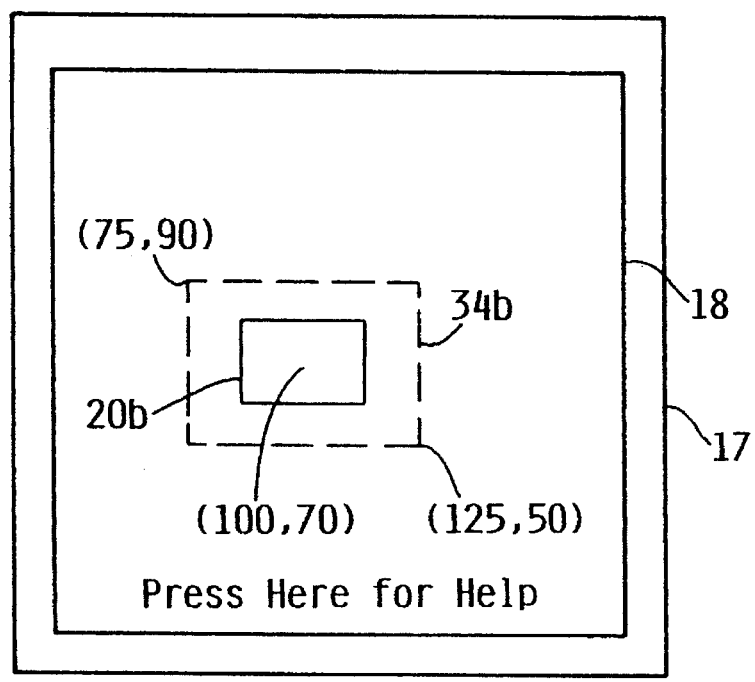
Figure 6E:
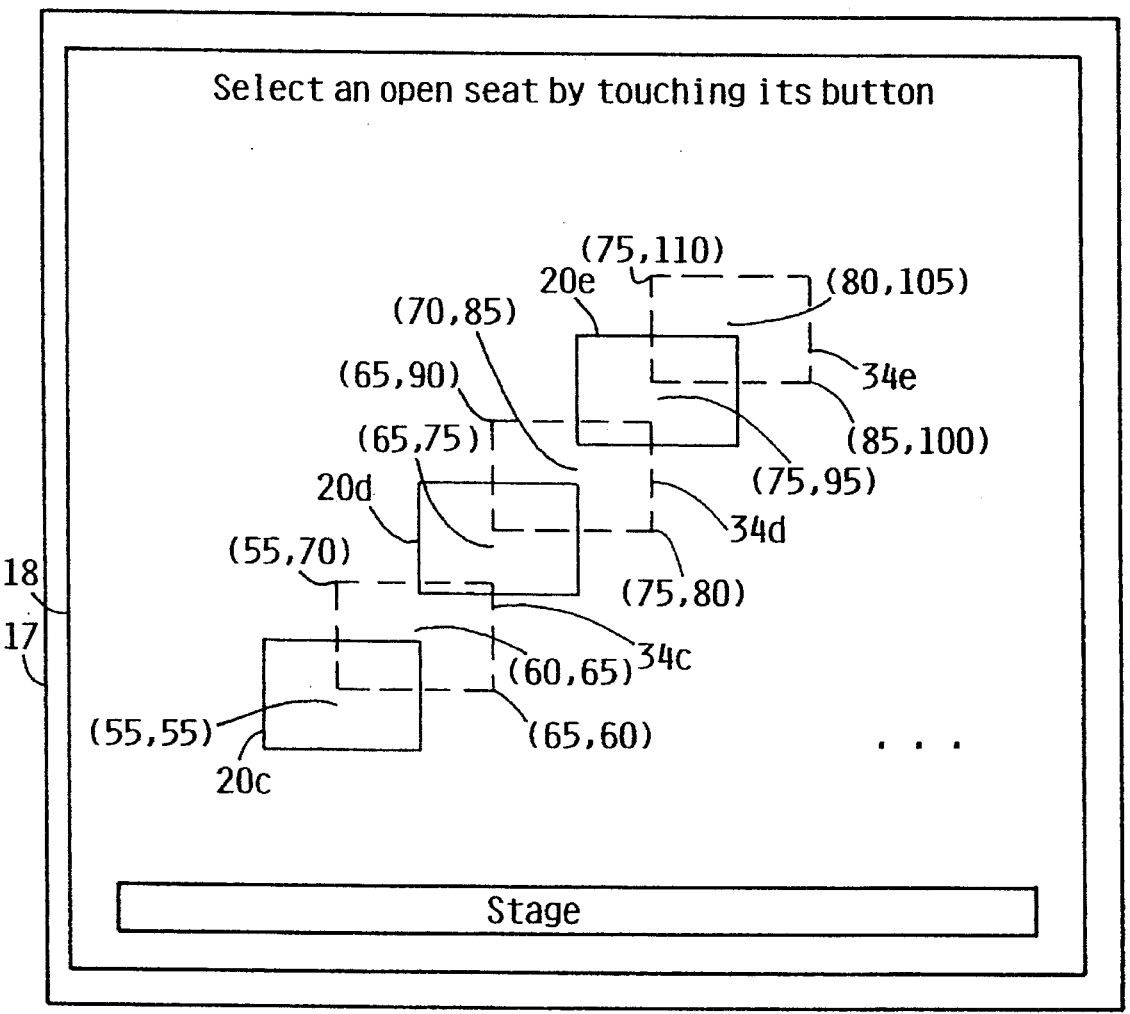

FIG. 5 shows a block diagram of computer system 10 of the preferred embodiment of the invention. Computer system 10 has touchscreen 18 in display 17 connected to system unit 11. System unit 11 contains processor 12 connected to memory 13, storage 14, and display adapter 15. Processor 12 is suitably programmed to carry out this invention, as described in more detail in the flowcharts of FIGS. 7, 8, and 9.

In the preferred embodiment, computer system 10 is an IBM PS/2, storage 14 is a magnetic hard disk file, display adapter 15 is an IBM VGA display adapter, and display 17 is an IBM 8516 display. Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 could be a microcomputer such as described above but connected to a larger computer system such as an IBM AS/400.

Button list 46 defines button sensing region 34 for each button 20. Factor list 47 contains a list of factors that represent the difference between the center of button sensing region 34 and the locations that the user has touched. In the preferred embodiment, adjustment factor 48 is the average of the factors in factor list 47. Button list 46, factor list 47, and adjustment factor 48 will be explained in more detail under the description of FIGS. 6a–6e.

FIGS. 6a, 6b, 6c, 6d, and 6e show factor list 47, adjustment factor 48, and the relationship of button list 46 to button 20 and button sensing region 34 in more detail. Button list 46 is a list of button entries. Each entry in button list 46 defines a button sensing region 34 for a button 20 on touchscreen 18 via fields 49, 50, 51, and 52. In the preferred embodiment, there is a separate button list for every screen of buttons displayed, but there could be just one button list for the entire application without departing from the invention. In the preferred embodiment, buttons are displayed as rectangles on the touchscreen, but the buttons could be any geometric shape including, but not limited to, circles, ovals, or polygons with any number of sides. Field 50 defines the upper left point of button sensing region 34. Field 51 defines the lower right point of button sensing region 34. Field 52 defines the center of the button sensing region 34. In this example, locations on touchscreen 18 are defined by a (X,Y) coordinate system with X representing the horizontal axis and Y representing the vertical axis and location (0,0) representing the lower left hand corner of touchscreen 18. However, other methods of defining locations on touchscreen 18 could be used without departing from the invention. Note that in this example since button sensing region 34 is a rectangle, it would not be necessary to include field 52 in button list 46 since it could be calculated from field 50 and field 51.

In one preferred embodiment, there are two types of button entries in button list 46 associated with the two types of buttons. Type 49 in the button entry indicates whether the button entry is associated with an adjusting button or a non-adjusting button. In one preferred embodiment, the locations that the user touches associated with adjusting buttons are used to calibrate the button sensing regions of subsequent non-adjusting buttons. In an alternative embodiment, the locations that the user touches associated with adjusting buttons are used to remap subsequent touched locations into the button sensing regions of non-adjusting buttons. In this example, buttons 20a and 20b are adjusting buttons, while buttons 20c, 20d, and 20e are non-adjusting buttons. In the preferred embodiment, adjusting buttons have button sensing regions that are larger than their associated buttons, and the button sensing regions for adjusting buttons do not move. In the preferred embodiment, non-adjusting buttons have button sensing regions that are the same size and shape as their associated buttons and the button sensing regions for the non-adjusting buttons are calibrated based on where the user touched on the adjusting buttons. However, the button sensing regions could be other sizes or shapes without departing from the invention.

In this example, button list 46 contains button entries 53, 54, 55, 56, and 57, which correspond to buttons 20a, 20b, 20c, 20d, and 20e, and button sensing regions 34a, 34b, 34c, 34d, and 34e, respectively. In one preferred embodiment, adjusting buttons are displayed to the user first, but adjusting and non-adjusting buttons could be displayed to the user in any order. Adjusting and non-adjusting buttons could share the same screen or be on different screens.

Factor list 47 contains the differences between the location that the user touched on an adjusting button and the center of button sensing region 34. In this example, factor list 47 contains two factors because there are two adjusting buttons in button list 46, each of which was touched once by the user. However, an application could have the user touch an adjusting button more than once, in which case there would not be a one-to-one correspondence between the number of factors in the factor list and the number of adjusting buttons in the button list.

In one preferred embodiment, adjustment factor 48 is set to be the average of all factors in factor list. However, other methods of setting the adjustment factor could be used, including using the mean of the factors or weighting the recent factors more than the remote factors.

Figure 7:
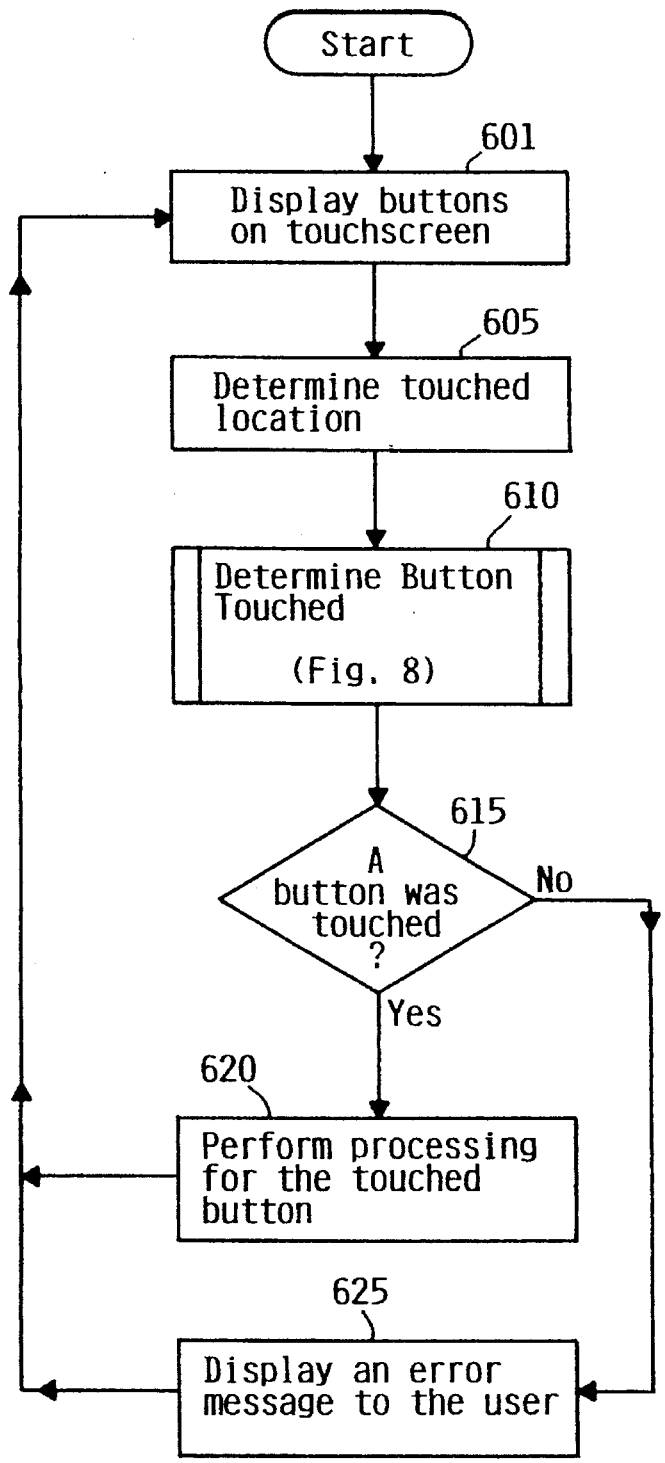
FIGS. 7, 8, and 9 show the flowcharts that describe the operation of the preferred embodiment.
Figure 8B:
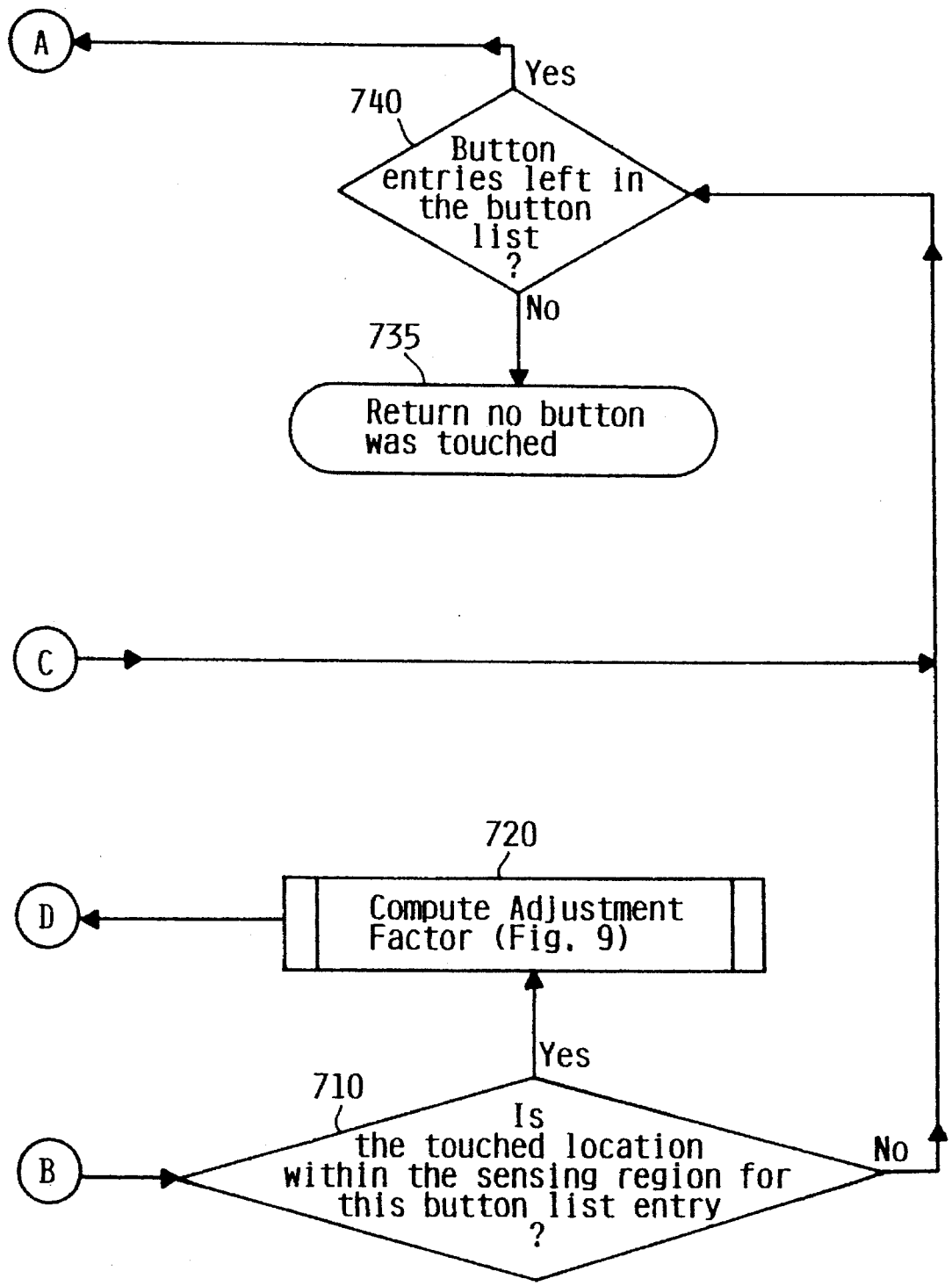
Figure 9:
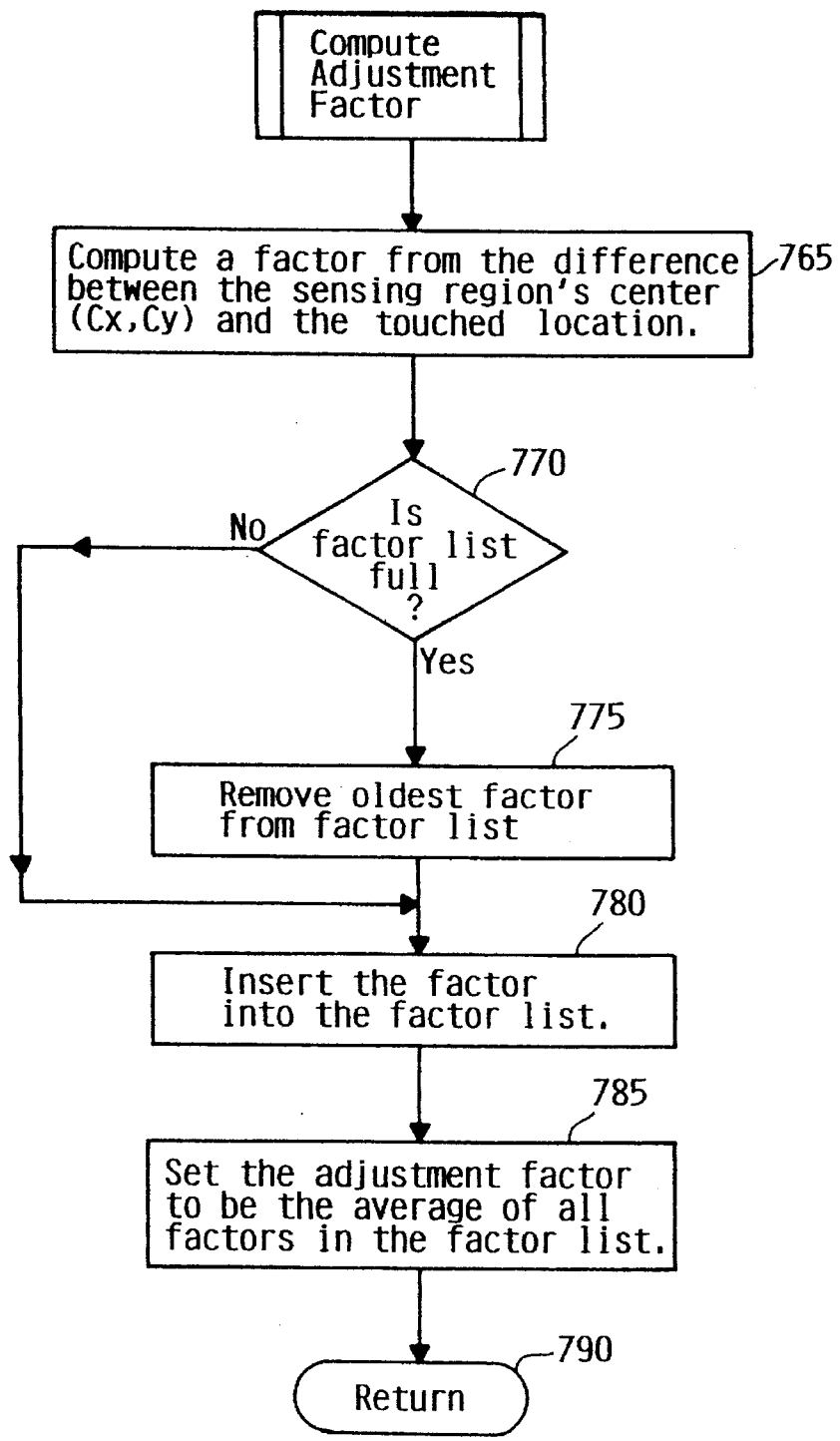

The operation of one preferred embodiment, as shown in the flowcharts of FIGS. 7–9, will now be described in more detail. Referring to FIG. 7, block 601 displays buttons on the touchscreen to the user. The number and configuration of the buttons displayed are dependent on the particular application that the user is accessing. When the user touches the touchscreen, block 605 determines the location that the user touched. Touchscreens are well known in the art that provide the coordinates of the touched location via sensors on the touchscreen such as light emitting diodes and photo detectors. This invention is independent of the method of touched location determination. Block 610 determines which button the user touched by calling the Determine Button Touched subroutine, which is described in detail in FIG. 8.

Referring to FIG. 8, block 701 gets a button entry from button list 46. Block 705 checks to see if this button entry is for an adjusting button. This check is accomplished by examining type field 49 in the button entry. If this button entry is an adjusting button and the location that the user touched is within the button sensing region for this button entry, blocks 705 and 710 are answered affirmatively. A new adjustment factor is computed by calling the Compute Adjustment Factor subroutine, which is described in FIG. 9.

Referring to FIG. 9, block 765 computes a factor from the difference between the center of the sensing region and the touched location. If block 770 determines that factor list 47 is full, the oldest factor from factor list 47 is removed in block 775. This is necessary because the memory available to store factors is finite. The newly calculated factor is inserted in factor list 47 in block 780. Adjustment factor 48 is set to be the average of all factors in factor list 47 in block 785. Although the preferred embodiment sets the adjustment factor to the average of the factors in the factor list, alternative embodiments could use another method, such as giving recent factors more weight than remote factors or using the mean of the factors. Block 790 returns control from the Compute Adjustment Factor Subroutine to block 730 in FIG. 8. Block 730 returns an indication of which button was touched to block 615 of FIG. 7.

Referring to FIG. 8, if block 710 determines that the touched location is not within the sensing region for the button entry and if block 740 determines that there are button entries left in button list 46, then the next button entry in button list 46 is processed in block 701. If block 740 determines that there are no button entries left in button list 46, then the user has touched a location on the screen that is not associated with any button, so an indication that no button was touched is returned in block 735 to block 615 in FIG. 7.

Referring to FIG. 8, if block 705 determines that the button entry is for a non-adjusting button, then block 715 checks to see whether remap mode (alternative embodiment) or calibrate mode (preferred embodiment) is desired. If block 715 determines that calibrate mode is desired, block 717 sets the sensing region to be the button location modified by adjustment factor 48. If block 715 determines remap mode is desired, block 719 modifies the touched location by the negative of adjustment factor 48. If block 725 determines that the touched location is within the sensing region for the button list entry, then an indication of which button was touched is returned in block 730 to block 615 of FIG. 7. If block 725 determines that the touched location is not within the button sensing region for the button list entry, then if block 740 determines that there are button entries left in the button list, then the next button entry in button list 46 is processed in block 701. If block 740 determines that there are no button entries left in button list 46, then the user has touched a location on the screen that is not associated with any button, so an indication that no button was touched is returned in block 735 to block 615 in FIG. 7.

Referring again to FIG. 7, if block 610 returned an indication that a button was touched, then block 615 is answered affirmatively, so the appropriate processing is performed for the touched button by the application that the user is accessing in block 620. If block 610 returned an indication that no button was touched, then the user has touched a location on the touchscreen that is not associated with any button, so block 615 is answered negatively and block 625 displays an error message to the user. In either event, block 601 displays a new screen of buttons on the touchscreen.

While this invention has been described with respect to the preferred and alternative embodiments, it will be understood by those skilled in the art that various changes in detail may be made therein without departing from the spirit, scope, and teaching of the invention. For example, the type of applications that use a touchscreen may change from what is known today. In addition, touchscreen technology may become widely employed in consumer applications such as operator panels for consumer electronics, appliances, and automobiles. Accordingly, the herein disclosed invention is to be limited only as specified in the following claims.

What is claimed is:

1. A touchscreen apparatus for receiving instructions from a user, comprising:

means for displaying a first button on the touchscreen, the first button having a first sensing region, wherein the first button is pressed when the user touches within the first sensing region;

means for receiving an indication that the user touched the touchscreen at a first location;

means for determining that the first location is within the first sensing region of the first button;

means for calculating a first factor based on the distance of the first location from the center of the first sensing region;

means for displaying a second button on the touchscreen, the second button having a second sensing region, wherein the second button is pressed when the user touches within the second sensing region;

means for receiving an indication that the user touched the touchscreen at a second location;

means for determining that the second location is within the sensing region of the second button;

means for calculating a second factor based on the distance of the second location from the center of the second sensing region, wherein the second factor is different from the first factor;

means for computing an adjustment factor by taking the average of the first factor and the second factor; and means for displaying a third button on the touchscreen, the third button having a third sensing region at a location modified by the adjustment factor, wherein the third button is pressed when the user touches within the third sensing region.

2. The touchscreen apparatus of claim 1, further comprising:

means for receiving an indication that the user touched the touchscreen at a third location; and means for determining that the third location is within the sensing region of the third button; and means for performing processing in response to the user pressing the third button.

3. A touchscreen apparatus for receiving instructions from a user, comprising:

means for displaying a first button on the touchscreen, the first button having a first sensing region, wherein the first button is pressed when the user touches within the first sensing region;

means for receiving an indication that the user touched the touchscreen at a first location;

means for determining that the first location is within the sensing region of the first button;

means for calculating a first factor based on the distance of the first location from the center of the first sensing region;

means for displaying a second button on the touchscreen, the second button having a second sensing region, wherein the second button is pressed when the user touches within the second sensing region;

means for receiving an indication that the user touched the touchscreen at a second location;

means for determining that the second location is within the sensing region of the second button;

means for calculating a second factor based on the distance of the second location from the center of the second sensing region, wherein the second factor is different from the first factor;

means for computing an adjustment factor by taking the average of the first factor and the second factor;

means for displaying a third button having a third sensing region, wherein the third button is pressed when the user touches within the third sensing region;

means for receiving an indication that the user touched the touchscreen at a third location;

means for remapping the third location into a remapped location based on the average of the first factor and the second factor;

means for determining that the remapped location is within the third sensing region; and means for performing processing in response to the user pressing the third button.

4. A method of dynamically adjusting a sensing region on a touchscreen, comprising the machine executed steps of:

displaying a first button on a touchscreen, the first button having a first sensing region, wherein the first button is pressed when the user touches within the first sensing region;

receiving an indication that a user touched the touchscreen at a first location;

determining that the first location is within the first sensing region of the first button;

calculating a first factor based on the distance of the first location from the center of the first sensing region;

displaying a second button on the touchscreen, the second button having a second sensing region, wherein the second button is pressed when the user touches within the second sensing region;

receiving an indication that the user touched the touchscreen at a second location;

determining that the second location is within the sensing region of the second button;

calculating a second factor based on the distance of the second location from the center of the second sensing region, wherein the second factor is different from the first factor;

computing an adjustment factor by taking the average of the first factor and the second factor; and displaying a third button on the touchscreen, the third button having a third sensing region at a location modified by from the adjustment factor, wherein the third button is pressed when the user touches within the third sensing region.

5. The method of claim 4, further comprising:

receiving an indication that the user touched the touchscreen at a third location;

determining that the third location is within the sensing region of the third button; and performing processing in response to the user pressing the third button.

6. A method of dynamically adjusting a sensing region on a touchscreen, comprising the machine executed steps of:

displaying a first button on the touchscreen, the first button having a first sensing region, wherein the first button is pressed when the user touches within the first sensing region;

receiving an indication that an user touched the touchscreen at a first location;

determining that the first location is within the sensing region of the first button;

calculating a first factor based on the distance of the first location from the center of the first sensing region;

displaying a second button on the touchscreen, the second button having a second sensing region, wherein the second button is pressed when the user touches within the second sensing region;

receiving an indication that the user touched the touchscreen at a second location;

determining that the second location is within the sensing region of the second button;

calculating a second factor based on the distance of the second location from the center of the second sensing region, wherein the second factor is different from the first factor;

computing an adjustment factor by taking the average of the first factor and the second factor;

displaying a third button on the touchscreen, the third button having a third sensing region, wherein the third button is pressed when the user touches within the third sensing region;

receiving an indication that the user touched the touchscreen at a third location;

remapping the third location into a remapped location based on the adjustment factor;

determining that the remapped location is within the third sensing region; and performing processing in response to the user pressing the third button.

* * * * *